United States Patent
Hachisu et al.

(10) Patent No.: US 6,788,381 B2
(45) Date of Patent: Sep. 7, 2004

(54) LIQUID CRYSTAL DEVICE

(75) Inventors: Takahiro Hachisu, Kanagawa (JP); Seishi Miura, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 110 days.

(21) Appl. No.: 09/988,107

(22) Filed: Nov. 19, 2001

(65) Prior Publication Data

US 2002/0113928 A1 Aug. 22, 2002

(30) Foreign Application Priority Data

Nov. 27, 2000 (JP) ........................................ 2000-360267

(51) Int. Cl.[7] .............................................. C09K 19/02
(52) U.S. Cl. ....................... 349/172; 349/123; 349/155; 349/156; 349/184
(58) Field of Search ................................ 349/172, 123, 349/155, 156, 184, 161

(56) References Cited

U.S. PATENT DOCUMENTS

| | | | | |
|---|---|---|---|---|
| 4,367,924 A | | 1/1983 | Clark et al. .................. | 350/334 |
| 4,682,858 A | * | 7/1987 | Kanbe et al. ................ | 350/334 |
| 5,699,139 A | * | 12/1997 | Aastuen et al. .............. | 349/156 |
| 5,815,230 A | | 9/1998 | Miura et al. ................. | 349/129 |
| 5,877,836 A | | 3/1999 | Miura et al. ................. | 349/184 |
| 6,184,967 B1 | * | 2/2001 | Lagerwall et al. ........... | 349/155 |
| 6,195,147 B1 | | 2/2001 | Asao et al. .................. | 349/133 |
| 6,337,730 B1 | * | 1/2002 | Ozaki et al. ................. | 349/156 |
| 6,603,528 B1 | * | 8/2003 | Tanaka et al. ............... | 349/156 |

FOREIGN PATENT DOCUMENTS

| | | |
|---|---|---|
| JP | 56-107216 | 8/1981 |
| JP | 2000-122100 | * 4/2000 |
| JP | 2000-235187 | * 8/2000 |

OTHER PUBLICATIONS

Schadt, et al., "Voltage–Dependent Optical Activity of a Twisted Nematic Liquid Crystal", Applied Physics Letters, vol 18, No. 4 (1971), pp. 127–128.

* cited by examiner

Primary Examiner—Nathan J. Flynn
Assistant Examiner—Ahmed N. Sefer
(74) Attorney, Agent, or Firm—Fitzpatrick, Cella, Harper & Scinto

(57) ABSTRACT

A liquid crystal device is constructed in such a structure that a plurality of stripe bulkheads substantially perpendicular to a direction of a layer of a smectic liquid crystal are provided on at least one of a pair of substrates retaining the smectic liquid crystal therebetween and that an elastic modulus E of the bulkheads, an outside pressure P, an area A1 of the substrate, a total area A2 of contact surfaces between the bulkheads and the substrate, and a volumetric shrinkage ratio $\Delta Vlc/Vlc$ of the smectic liquid crystal within an ambient temperature range of the liquid crystal device satisfy the following relation:

$$(1/E) \times P \times (A1/A2) \geq \Delta Vlc/Vlc,$$

whereby the bulkheads become able to be compressed in response to volumetric shrinkage of the liquid crystal.

10 Claims, 7 Drawing Sheets

LIQUID CRYSTAL DEVICE

BACKGROUND OF THE INVENTION

1. Field of the Invention

The present invention relates to a liquid crystal device and, more particularly, to a liquid crystal device in which bulkheads maintain a desired clearance between a pair of substrates retaining a liquid crystal therebetween.

2. Related Background Art

Conventionally, CRTs are known as displays that have most commonly been used heretofore, and the CRTs are now widely used as monitors for output of moving picture of TV, VTR, or the like, or for personal computers. However, the CRTs have such characteristics as to degrade the visibility by flicker, stripes due to insufficient resolution, etc. and deteriorate a phosphor by image persistence in the case of still images. Further, they have a large volume behind the screen because of their structure, which impedes space saving at offices and homes.

A solution to such imperfections of the CRTs was liquid crystal apparatus and among the known liquid crystal apparatus was one provided with a liquid crystal device using a twisted nematic (TN) liquid crystal, for example, as described in M. Schadt and W. Helfrich, "Applied Physics Letters Vol. 18, No. 4, p127–128 (Feb. 15, 1971)."

One of such liquid crystal devices using the TN liquid crystal was of the passive matrix type holding superiority in cost, but the liquid crystal devices of this type had the problem that crosstalk occurred during time-sharing addressing in matrix electrode structure of a high pixel density, and thus had a limit to the number of pixels.

On the other hand, the liquid crystal devices called TFT devices, different from the passive matrix type devices, have been developed in recent years. Since a transistor is fabricated at every pixel, these TFT liquid crystal devices solve the problems of crosstalk and slow response speed on one hand but have the following drawbacks on the other hand, however: it becomes harder to fabricate the liquid crystal device without defective pixels as the area increases, and, even if possible, the cost becomes enormous.

For overcoming the drawbacks of the conventional liquid crystal devices as described above, Clark and Lagerwall proposed the liquid crystal device of the type utilizing the refractive index anisotropy of ferroelectric liquid crystal molecule and controlling transmitted light rays by combination with a polarizing element (Japanese Patent Application Laid-Open No. 56-107216, U.S. Pat. No. 4,367,924, and so on).

In general, this ferroelectric liquid crystal (FLC) has a chiral smectic C phase (SmC*) or H phase (SmH*) in a specific temperature region and in this condition, it has such a property that it takes either of a first optically stable state and a second optically stable state in response to an applied electric field and it maintains either state in the absence of application of an electric field, i.e., bistable memory nature. Moreover, it undergoes inversion switching because of spontaneous polarization and thus demonstrates a very fast response speed. Further, it is also excellent in viewing angle characteristics and is thus suitable, particularly, for high speed, high definition, and large screen display devices.

Incidentally, such ferroelectric liquid crystal devices in an initial orientation stage are in a state in which liquid crystal molecules oriented in a first stable state and liquid crystal molecules oriented in a second stable state are mixed in a domain. Namely, since the chiral smectic liquid crystal in the bistable state has almost equivalent energy levels of orientation regulating force to orient the liquid crystal molecules into the first stable state and orientation regulating force to orient the liquid crystal molecules into the second stable state, the liquid crystal molecules oriented in the first stable state and in the second stable state are mixed in each domain in the initial orientation stage, on the occasion of alignment under a condition of sufficiently thin alignment layers for the chiral smectic liquid crystal to demonstrate bistability.

On the other hand, among the ferroelectric liquid crystals is a τVmin mode liquid crystal, which has negative dielectric anisotropy ($\Delta\varepsilon<0$) and positive biaxial dielectric anisotropy ($\Delta\varepsilon>0$) and which exhibits a τVmin characteristic, because the dielectrically anisotropic torque to stabilize the liquid crystal is greater than the reversing torque of ferroelectric liquid crystal.

The τVmin characteristic is such a characteristic that the response speed of liquid crystal ($\tau$) a certain minimum (τVmin) with increase in the applied voltage (V), and possession of this τVmin characteristic makes it feasible to implement achievement of high luminance, high contrast, and high speed.

Liquid crystals demonstrating the antiferroelectric property are also known as the technology of constructing the display devices by making use of the refractive index anisotropy and spontaneous polarization of like liquid crystal molecules. Here the antiferroelectric liquid crystals (A-FLCs) generally have a chiral smectic CA phase (SmCA*) in a specific temperature region and in this condition, they have such a property that an average optically stable state is a direction normal to the smectic layer in the absence of the electric field but the average optically stable state is inclined from the direction normal to the layer in the presence of the electric field. In addition, the antiferroelectric liquid crystals also undergo switching because of coupling of spontaneous polarization with the electric field, thus exhibit very fast response speeds, and are expected to realize fast display devices.

Meanwhile, in order to uniformly drive the liquid crystal device employing the ferroelectric liquid crystal or the antiferroelectric liquid crystal, in the plane of the liquid crystal panel, it is necessary to keep glass substrates, which are an example of a pair of transparent substrates provided with transparent electrodes, uniform with a small fixed clearance (cell gap) between them.

The liquid crystal devices are normally constructed in such structure that the liquid crystal is filled in the small gap between two glass substrates and a voltage not less than a certain fixed threshold is applied between the transparent electrodes provided on the respective glass substrates to drive the liquid crystal. Because of this structure, if the gap between the glass substrates is nonuniform, different electric fields will be applied in plane to the liquid crystal panel, so as to cause in-plane (longitudinal) dispersion during driving of the liquid crystal.

Particularly, in use of the ferroelectric liquid crystal (FLC) or the antiferroelectric liquid crystal (A-FLC), the clearance between the pair of glass substrates needs to be as narrow as about 1 to 3 μm, and production of the thin and uniform cell gap in plane is a hard technique while being also a very important constituent.

Methods of uniformly maintaining a pair of glass substrates with a small fixed clearance between are generally categorized into methods of placing spherical spacers between the substrates and methods of forming stripe bulkhead structures on at least one of a pair of substrates retaining the liquid crystal between, by employing flexible printing, photolithography, dry film, and so on.

FIG. 6 is a cross-sectional view of a liquid crystal device in which the cell gap is retained by use of the conventional spherical spacers. It is possible to form even a relatively narrow cell gap by use of the spherical spacers 50 as long as the spacers 50 can be made in uniform size. However, since a number of spacers 50 are scattered over one substrate 52 out of a pair of glass substrates 51, 52 in a liquid crystal device fabrication step, some spacers 50 are also placed within the pixel display areas. As a result, alignment defects occurred around the spacers 50 and posed a problem of failure in achieving satisfactory contrast of the liquid crystal device.

In order to maintain the cell gap, granular adhesive particles 53 are also scattered in addition to the spacers 50, as shown in FIG. 6, in certain cases. In such cases, alignment defects also occur around the adhesive particles 53 as around the spacers 50, and result in failure in achieving satisfactory contrast of the liquid crystal device.

On the other hand, FIG. 7 is a cross-sectional view of a liquid crystal device in which the cell gap is maintained by use of the conventional stripe bulkhead structures. When the stripe bulkhead structures 60 are employed, the bulkhead structures 60 are selectively laid in non-pixel areas of the liquid crystal device by the photolithography technology and thus no foreign matter is mixed in the pixel display areas, so as to cause few alignment defects.

Since it is also possible to provide the bulkheads themselves with a function of bonding the pair of upper and lower glass substrates 51, 52 to each other in addition to the function of controlling the cell gap, the number of alignment defects in the pixel display areas can be made much smaller than that in the case using the granular adhesive particles shown in FIG. 6.

In the case using the bulkhead structures 60, however, the liquid crystal 61 confined by the bulkhead structures 60 experiences volumetric shrinkage, as shown in FIG. 7, because of temperature change or phase change of the liquid crystal in process steps such as a filling step and the like. If the bulkhead structures 60 are unable to shrink similarly in response to the liquid crystal 61 by stress occurring between the substrates in accordance therewith, the interior of the liquid crystal will go into a negative pressure state and a void can appear and grow at a place or at two or more places in the liquid crystal, or a clearance can be made relative to the bulkhead surfaces.

The occurrence of a void in the liquid crystal device as described above will naturally result in making portions lacking the liquid crystal inside the liquid crystal device and during driving of the liquid crystal device such portions will not be driven, so as to remain as black patterns. As a result, the device will fail to accurately display letters, graphics, etc. and they can cause degradation of various characteristics such as lowering of contrast and the like.

Since the ferroelectric liquid crystals are smectic liquid crystals, they demonstrate large volumetric shrinkage, particularly, due to phase change, and thus to avoid the generation of a void is an important factor in fabrication of a panel with good characteristics.

SUMMARY OF THE INVENTION

The present invention has been accomplished in view of such circumstances and an object of the invention is to provide a liquid crystal device that can prevent the generation of a void part due to the phase change of liquid crystal.

According to a first aspect of the present invention, there is provided a liquid crystal device comprising a pair of substrates retaining a smectic liquid crystal therebetween and a plurality of bulkheads intersecting with a direction of a layer of the smectic liquid crystal provided on at least one of the pair of substrates, wherein an elastic modulus E of the bulkheads, an outside pressure P, an area A1 of the substrate, a total area A2 of contact surfaces between the bulkheads and the substrate, and a volumetric shrinkage ratio $\Delta Vlc/Vlc$ of the smectic liquid crystal within an ambient temperature range of the liquid crystal device satisfy the following relation:

$$(1/E) \times P \times (A1/A2) \geq \Delta Vlc/Vlc.$$

According to a second aspect of the present invention, there is provided a liquid crystal device comprising a pair of substrates retaining a smectic liquid crystal therebetween and a plurality of stripe bulkheads intersecting with a direction of a layer of the smectic liquid crystal provided on at least one of the pair of substrates, wherein an elastic modulus E, a height L, a spacing D, and a length H of the bulkheads, an outside pressure P, an area A1 of the substrate, a total area A2 of contact surfaces between the bulkheads and the substrate, and a volumetric shrinkage amount $\Delta Vlc$ within an ambient temperature range of the liquid crystal device, of the smectic liquid crystal filled in a space defined by the pair of substrates and a pair of bulkheads satisfy the following relation:

$$(1/E) \times L \times P \times (A1/A2) \geq \Delta Vlc/(D \times H).$$

According to a third aspect of the present invention, there is provided a method of producing a liquid crystal device, comprising in an order mentioned below the steps of:

(1) forming a stripe bulkhead on a first substrate;
(2) rubbing the first substrate substantially parallel to the direction of the stripe of the bulkhead;
(3) opposing and bonding the first substrate and a second substrate having no bulkhead formed thereon to each other, thereby forming a cell;
(4) filling the cell with a liquid crystal; and
(5) cooling the cell to a temperature not more than a smectic phase transition temperature of the liquid crystal, thereby forming a smectic layer substantially perpendicular to the bulkhead, wherein an elastic modulus E of the bulkhead, an atmospheric pressure P, an area A1 of the second substrate, a total area A2 of contact surfaces between the bulkhead and the second substrate, and a volumetric shrinkage ratio $Vlc/Vlc$ of the liquid crystal within a temperature variation range in the steps including and succeeding the step (4) satisfy the following relation:

$$(1/E) \times P \times (A1/A2) \geq \Delta Vlc/Vlc.$$

When the liquid crystal device is constructed so as to satisfy the above relation, the bulkheads become able to shrink in response to the volumetric shrinkage of the liquid crystal, thereby preventing the occurrence of a void.

DETAILED DESCRIPTION OF THE PREFERRED EMBODIMENTS

Embodiments of the present invention will be described below.

Figure 1:
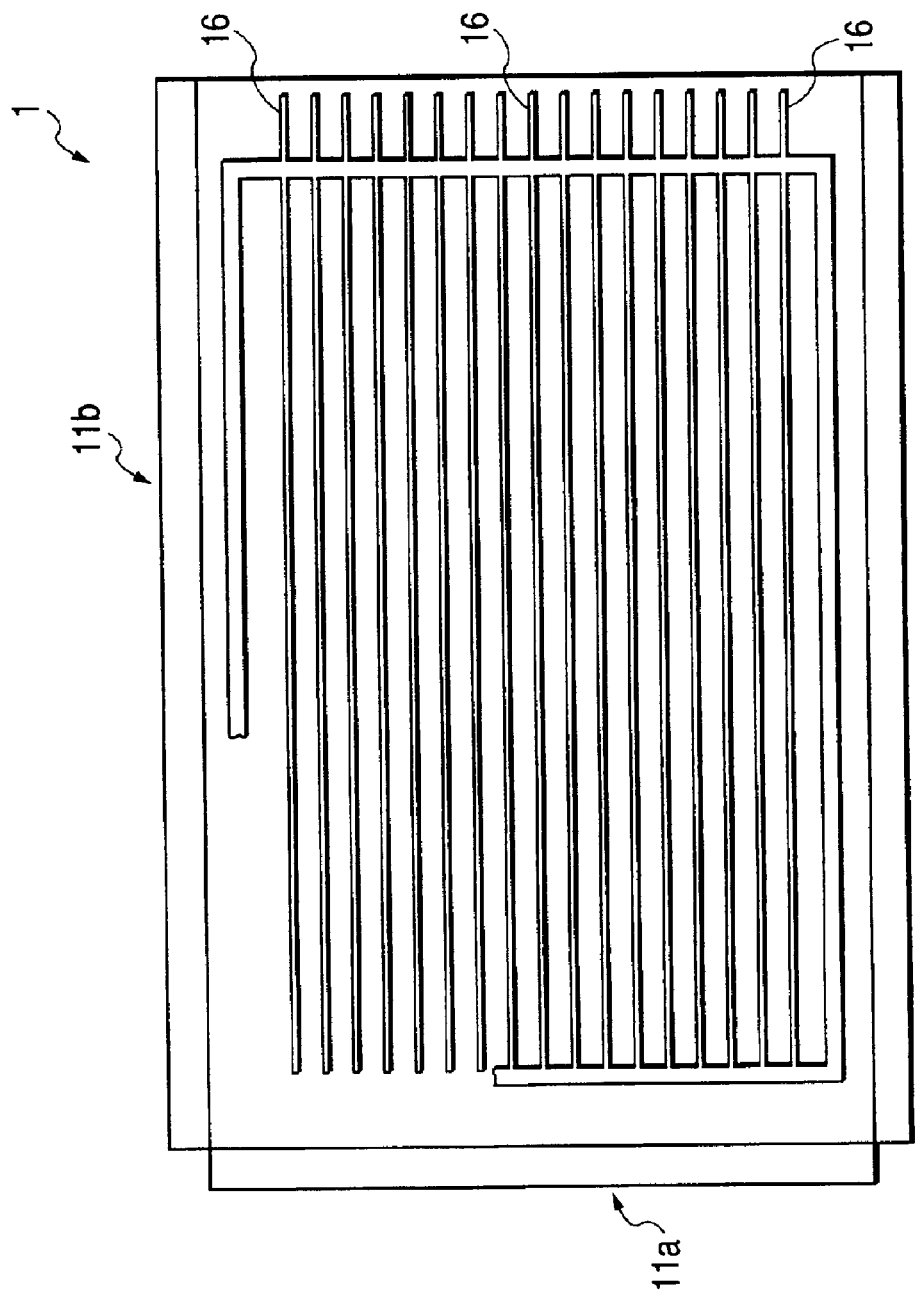
FIG. 1 is a schematic plan view of a liquid crystal device according to an embodiment of the present invention.
Figure 2:
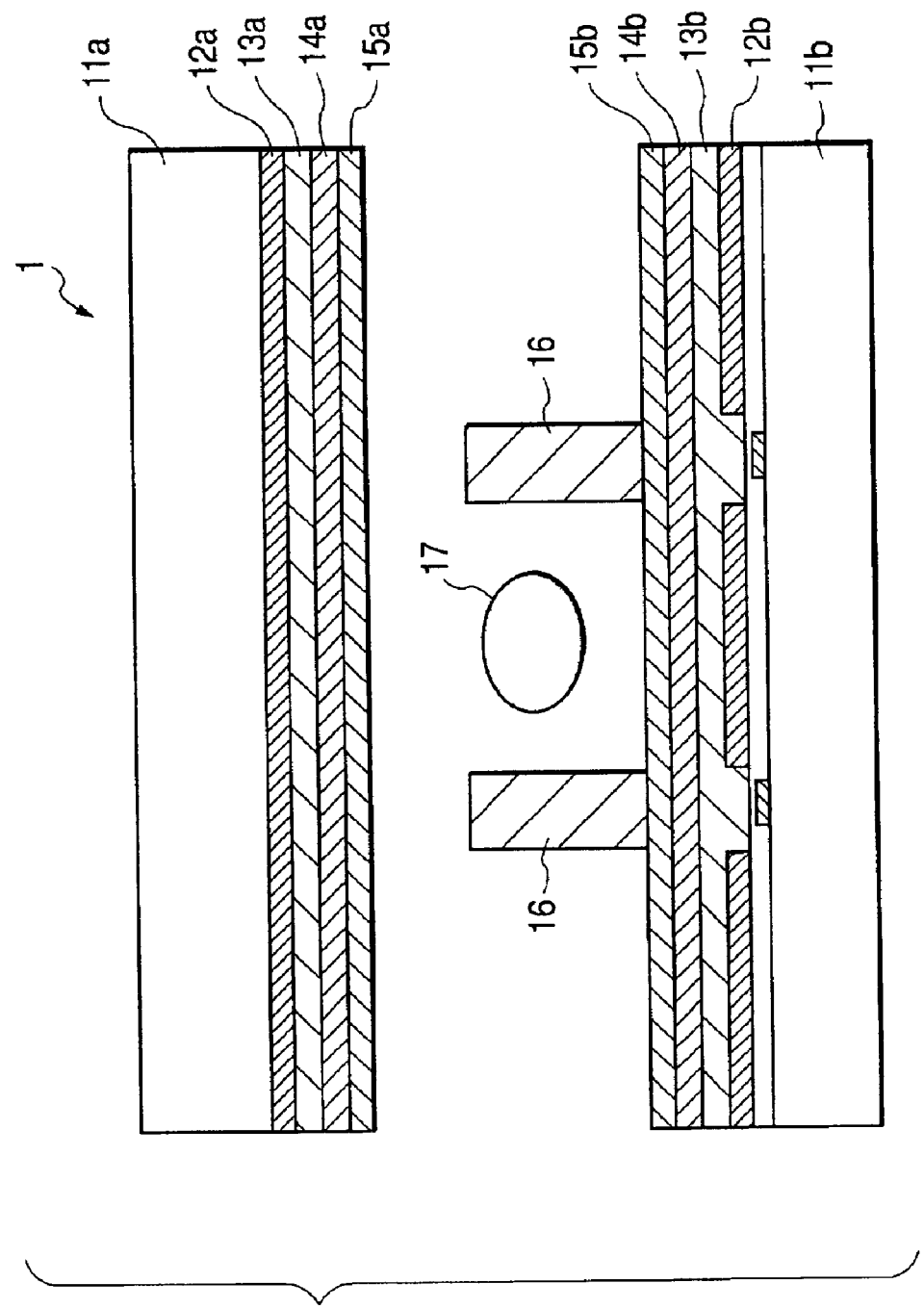
FIG. 2 is a schematic sectional view of a major part of the liquid crystal device of FIG. 1.

FIG. 1 is a schematic plan view of a liquid crystal device according to an embodiment of the present invention and FIG. 2 a schematic cross-sectional view of major part thereof.

In FIGS. 1 and 2, reference symbol 1 designates a liquid crystal device; symbols 11a and 11b glass substrates; 12a and 12b ITO electrodes formed on surfaces of the respective glass substrates 11a, 11b; 13a and 13b insulating films formed on the respective ITO electrodes 12a, 12b; 14a and 14b inorganic oxide insulating film layers formed on the respective insulating films 13a, 13b; and 15a and 15b alignment layers which are formed on the surfaces of the respective glass substrates 11a, 11b and which are functional films treated by an aligning treatment for aligning the liquid crystal.

Figure 3:
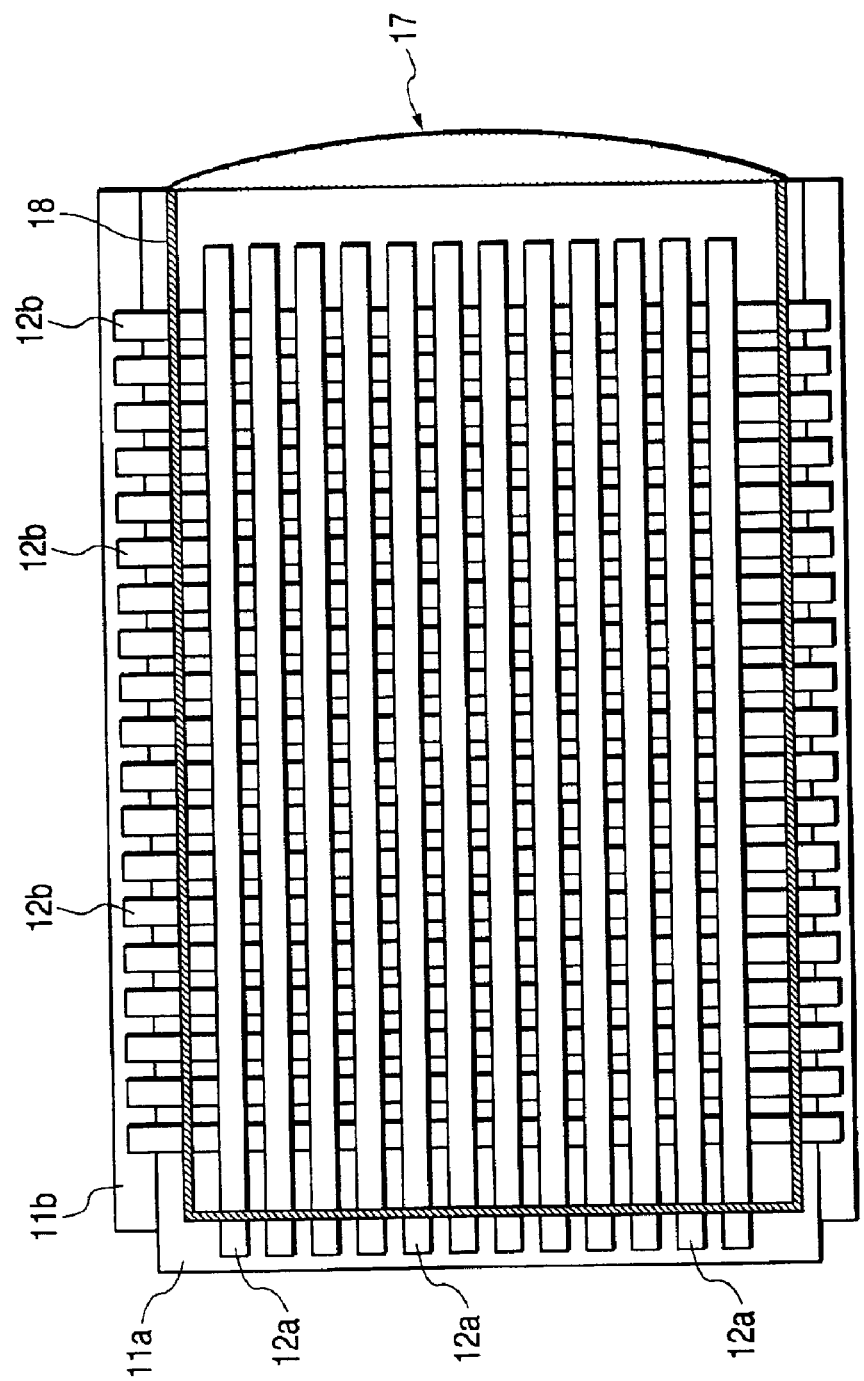
FIG. 3 is a schematic view for explaining a part of a method of fabricating the liquid crystal device of FIG. 1.

Numeral 16 denotes bulkhead structures (hereinafter, simply referred to as "bulkheads") formed in non-pixel areas on the surface of the glass substrate 11a, and 17 a liquid crystal filled in a space defined by the glass substrates 11a, 11b and the bulkheads 16. The ITO electrodes 12a, 12b are formed each in stripe shape and arranged so as to be perpendicular to each other, as shown in FIG. 3 described hereinafter. The ITO electrodes 12a, 12b and the bulkheads 16 are formed on the glass substrates 11a, 11b by the photolithography technology.

A method of fabricating the liquid crystal device 1 of this structure will be described below.

First, transparent electrode layers of ITO are formed in the thickness of 400 to 2000 Å on the respective surfaces of the glass substrates 11a, 11b by sputtering and then patterned in stripe shape by photolithography, thereby forming the ITO electrodes 12a, 12b.

Then, the insulating films 13a, 13b are formed, for example, in the thickness of 400 to 2500 Å on the respective glass substrates 11a, 11b. In the present embodiment, an insulating film material of a coating and baking type is used for the insulating films 13a, 13b, and a solution thereof is printed and applied, for example, by Angstromer or the like and thereafter baked at 200 to 300° C. to form the insulating films 13a, 13b.

In order to further enhance electric insulation between the upper and lower substrates, the inorganic oxide insulating film layers 14a, 14b are formed in the thickness of 50 to 600 Å on the respective insulating films 13a, 13b. Thereafter, a polyimide film is applied onto the inorganic oxide insulating film layers 14a, 14b by a spinner and then a heat baking treatment thereof is carried out to form the alignment layers 15a, 15b in the thickness of about 100 Å.

Then, the bulkheads 16 are formed as follows in the non-pixel areas on one glass substrate 11b, i.e., in the areas where the ITO electrodes 12b are not formed. In the present embodiment, an acrylic photosensitive material (product name: CFPR-016S available from Tokyo Ouyo Gakusha Co., Ltd.) is used as a material of the bulkheads 16.

First, the acrylic photosensitive material is applied onto the glass substrate 11b with the ITO electrodes 12b patterned thereon, by spin coating, and is then prebaked at 80 to 90° C. for 180 sec. This is cooled to room temperature and thereafter is exposed through a mask to ultraviolet light of 360 mJ/cm$^2$ (wavelength 365 nm) from an extra-high pressure mercury lamp. Then, the photosensitive material is developed with an alkali developer (a 3% aqueous solution of potassium carbonate) for 70 sec and thereafter rinsed with pure water. Then, the photosensitive material is postbaked at 200° C. in a clean oven for 10 min, thus forming the bulkheads 16.

Then, the surfaces of the alignment layers on the substrate 11b having the bulkheads 16 formed in this way and on the glass substrate 11a without any bulkhead structure are subjected to a rubbing treatment to rub the surfaces with a rubbing cloth of cotton along a liquid crystal filling direction from the filling inlet side not shown. This filling direction is parallel to the extending direction of the bulkheads.

Then, a silica solution with unrepresented ultrafine particles of SiO$_2$ (particle size of about 1.0 μm) dispersed therein is applied onto the glass substrate 11b with the bulkheads 16 formed thereon, by the spinner. Here, the silica solution is also applied onto the top surfaces of the bulkheads 16, but during bonding of the upper and lower substrates 11a, 11b the SiO$_2$ ultrafine particles are stuck in the interior of the bulkheads 16, thus posing no problem against the cell gap.

Then, an adhesive 18 of an epoxy resin is applied onto three side edges except for the side edge on the filling inlet side of the glass substrate 11b, as shown in FIG. 3, and thereafter the glass substrates 11a, 11b are bonded to each other so that the ITO electrodes 12a, 12b of the stripe pattern are perpendicular to each other. Then, the adhesive is heat-cured at 150° C. for 1.5 hours under pressure, thereby forming a liquid crystal cell.

Then, the liquid crystal cell produced in this way is evacuated and thereafter returned to the atmospheric pressure. The liquid crystal 17 is poured into the cell from the unrepresented filling inlet provided at one edge of the liquid crystal cell without a coating of the adhesive 18. The liquid crystal employed in the present embodiment is a ferroelectric liquid crystal with a negative value of dielectric anisotropy and liquid crystal used in the τVmin mode. It is, however, needless to mention that the present invention can also be applied to other smectic liquid crystals, without having to be limited to the above example.

The filling step of the liquid crystal is carried out in the isotropic phase or the nematic phase in which the liquid crystal demonstrates sufficient flowability. After the liquid crystal is charged in the cell, the filling inlet is sealed and the temperature is lowered to the room temperature to bring the liquid crystal into the ferroelectric phase (chiral smectic phase).

Described next are conditions for suppressing occurrence of a void part due to volumetric shrinkage of the liquid crystal 17 with temperature change, in the liquid crystal device provided with the stripe bulkheads 16, which was fabricated as described above.

Figure 4:
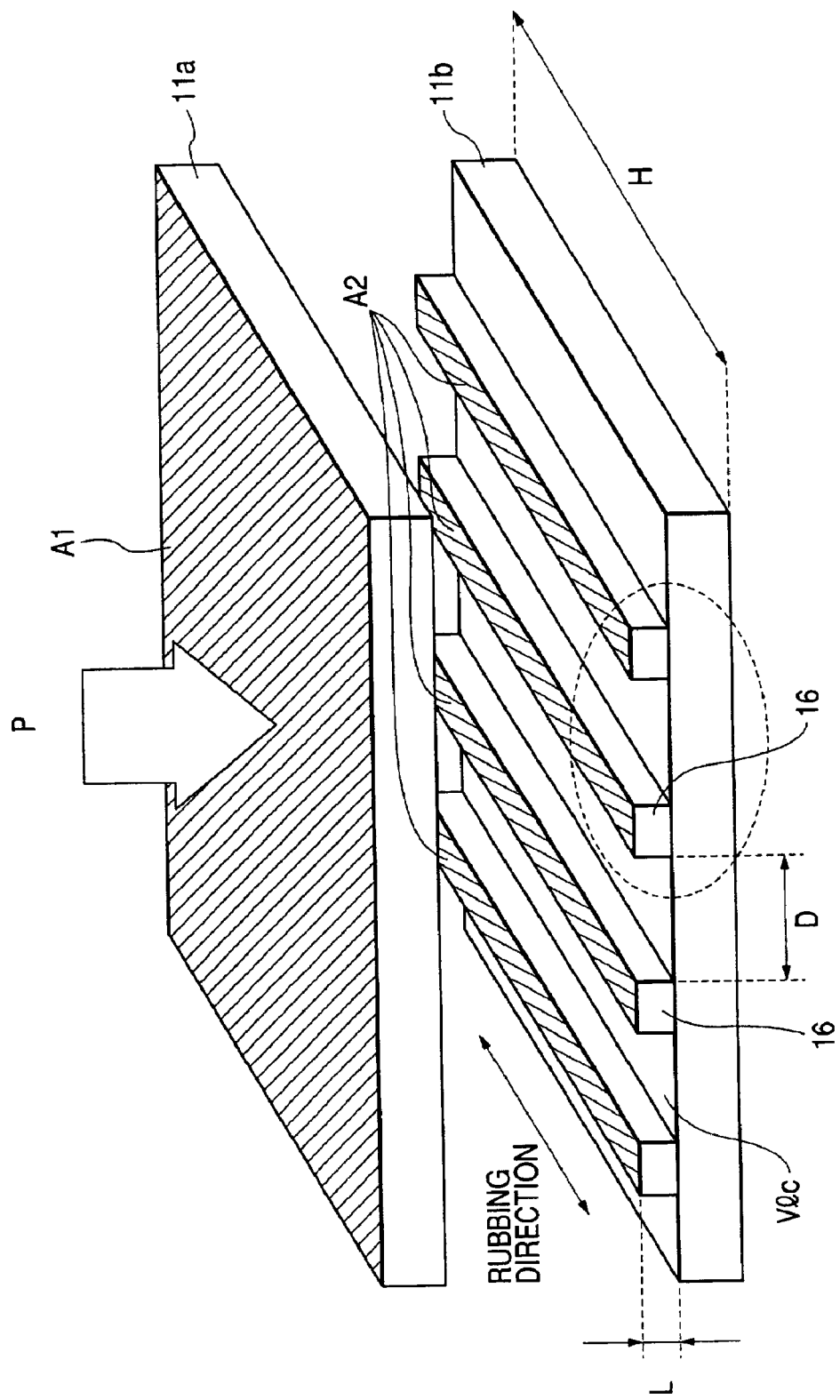
FIG. 4 is a schematic view showing a relation between stripe bulkheads and a liquid crystal provided in a liquid crystal device of the present invention.

FIG. 4 is a schematic view showing the relation between the stripe bulkheads 16 and the liquid crystal in the present invention, in which P represents the atmospheric pressure, L the height (thickness) of the bulkheads 16, A1 the surface area of the panel, A2 the total area of contact surfaces between the bulkheads 16 and one glass substrate 11a, H the length of the stripe bulkheads 16, D the spacing of the bulkheads 16, and Vlc the volume of the liquid crystal surrounded by the bulkheads 16.

In order to prevent the occurrence of a void or a gap due to the volumetric shrinkage of the liquid crystal, the following requirements need to be met.

(1) When there occurs the volumetric shrinkage of the liquid crystal, the bulkheads shrink in height in response thereto to bring about volumetric compression in the direction normal to the substrates (i.e., decrease in substrate clearance=cell thickness), thereby canceling the volumetric shrinkage parallel to the substrate.

(2) Migration of liquid crystal molecules caused by the compression in the direction normal to the substrates is effectively converted to compensation for the volumetric shrinkage parallel to the substrate.

In the description hereinafter, a volume change in the direction normal to the substrates will be referred to as compression, and a volume change parallel to the substrate as shrinkage.

Condition (1) above is met when the bulkheads have so sufficiently small elasticity that, when a void is about to be made because of shrinkage of the liquid crystal, they undergo compression under the atmospheric pressure so as to cancel the volume of the void. If the elasticity is too large, there will occur little compression of the bulkheads, so as to fail in completely compensating for the void. The elasticity of the bulkheads is determined by the cross-sectional shape, the plane shape, and the area ratio thereof to the substrate area, in addition to the elastic modulus of the material itself. In the present invention, these parameters are set so as to satisfy the above condition.

As for Condition (2), if there should occur uniform compression of the substrate clearance, the volume of the liquid crystal excluded by the compression would locally increase the density of the liquid crystal at that place so as to avoid a negative pressure there, whereby there would occur little migration of liquid crystal molecules.

However, amounts of compression of the substrate clearance=cell thickness are different depending upon distances from the bulkheads, because of deflection of the substrates; they are small near the bulkheads but large at places apart therefrom. In that case, migration of liquid crystal molecules needs to occur so as to cancel the compression differences depending upon locations. Since the flowability of many smectic liquid crystal molecules is high within a layer but low between layers, it is feasible to compensate for the differences of compression amounts due to the distance differences from the bulkheads, by forming the smectic layers so as to intersect with the bulkheads and thereby causing flow within each layer.

Further, it is also necessary to pay attention to the fact that if there is waviness, incommensurateness, etc. of the smectic layers the flowability becomes lower within the layers to make flow hard to occur in a large area. In order to eliminate such factors to impede the in-layer molecular migration as the waviness, incommensurateness, or the like of the smectic layers as much as possible, it is preferable to make the length in the direction of the smectic layers as short as possible. When the direction of the layers is made perpendicular to the direction of the bulkheads to divide the layers by the bulkheads so as to minimize the length in the layer direction, the migration of liquid crystal molecules due to the shrinkage in the direction normal to the substrates is most effectively converted to compensation for the volumetric shrinkage parallel to the substrate.

The condition (1) will be described below on a quantitative basis.

Figure 5:
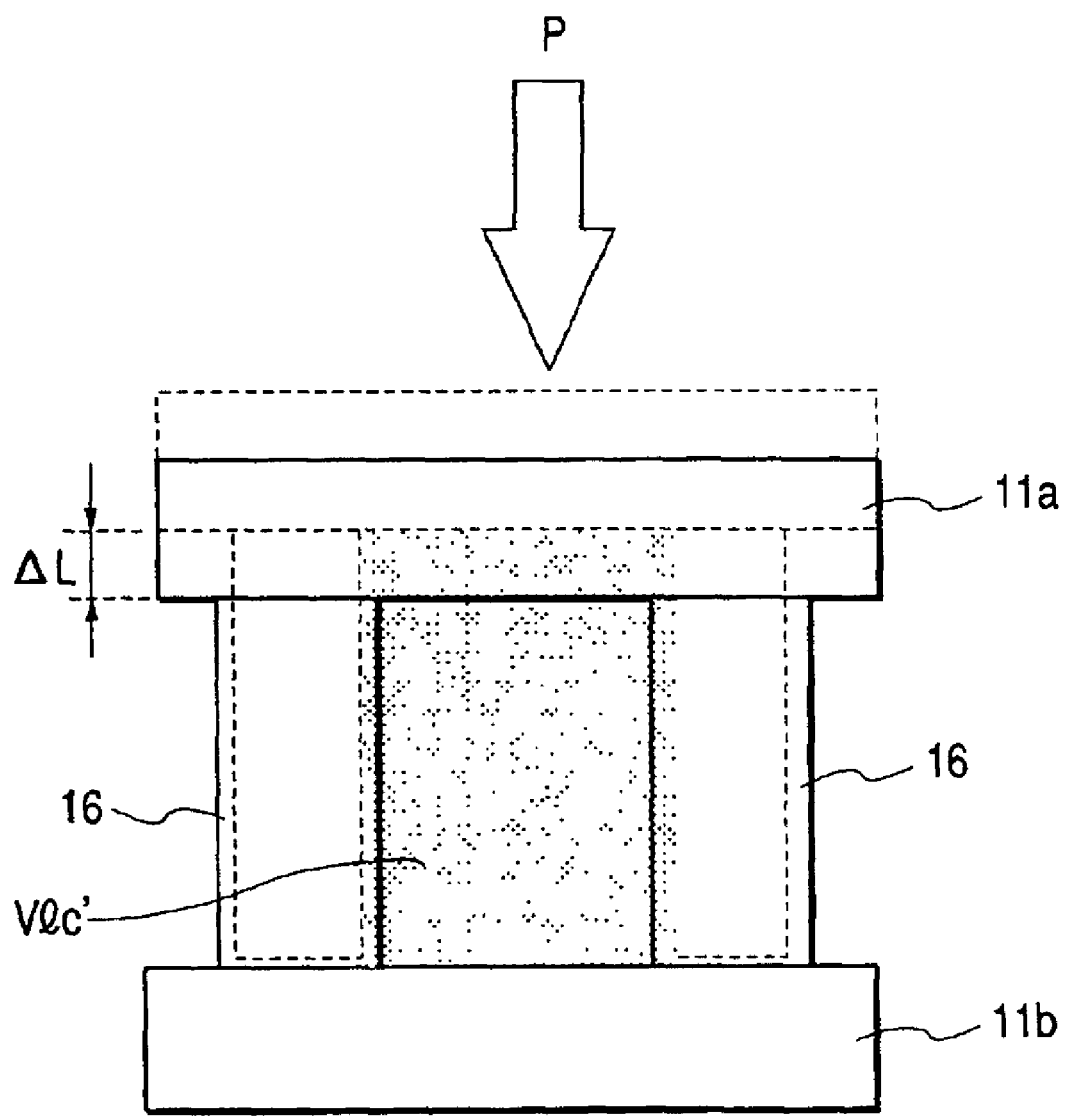
FIG. 5 is a schematic view showing a state of change in the height of bulkheads due to volumetric shrinkage of the liquid crystal.
Figure 6:
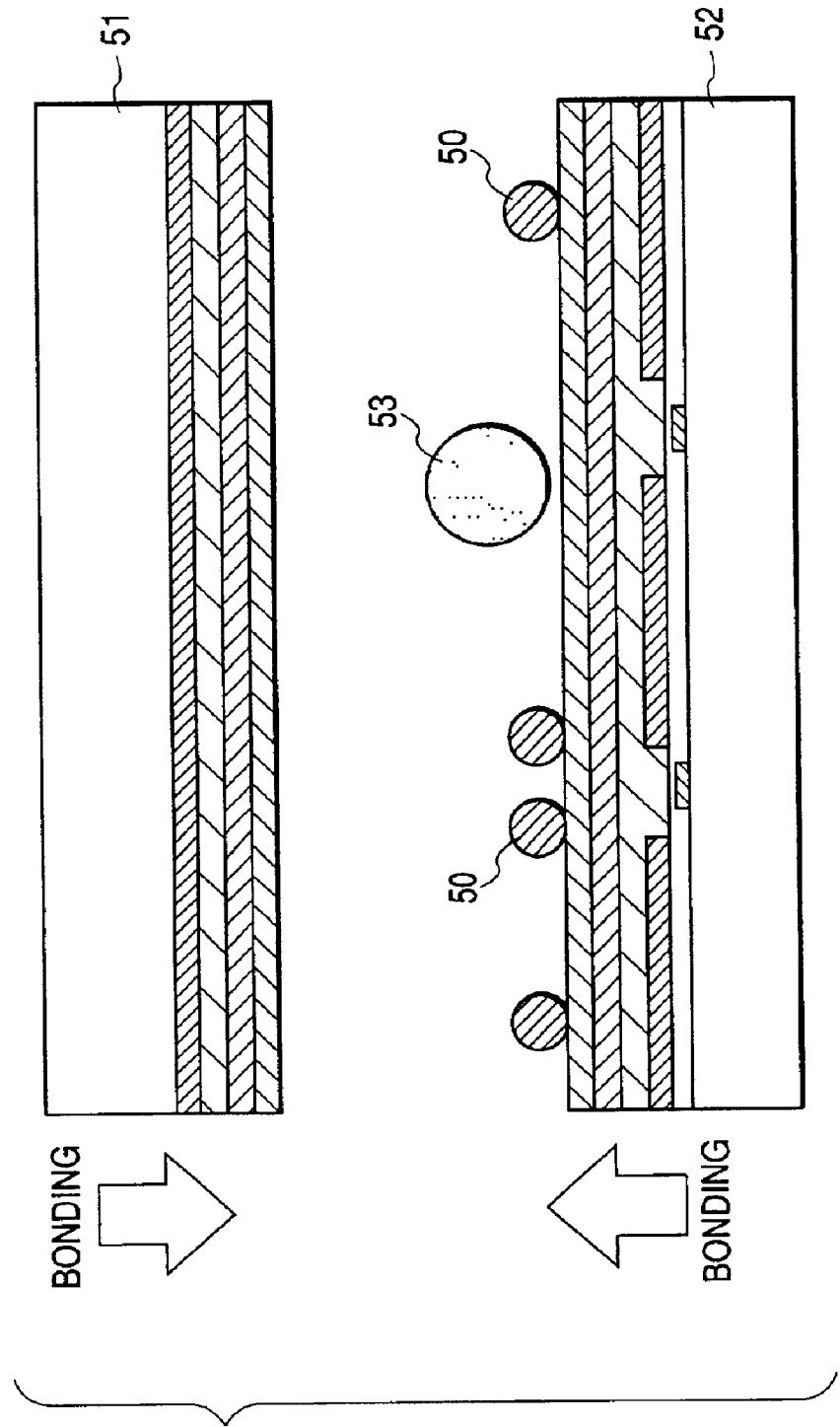
FIG. 6 is a schematic sectional view of a liquid crystal device in which a cell gap is maintained by use of conventional spherical spacers.
Figure 7:
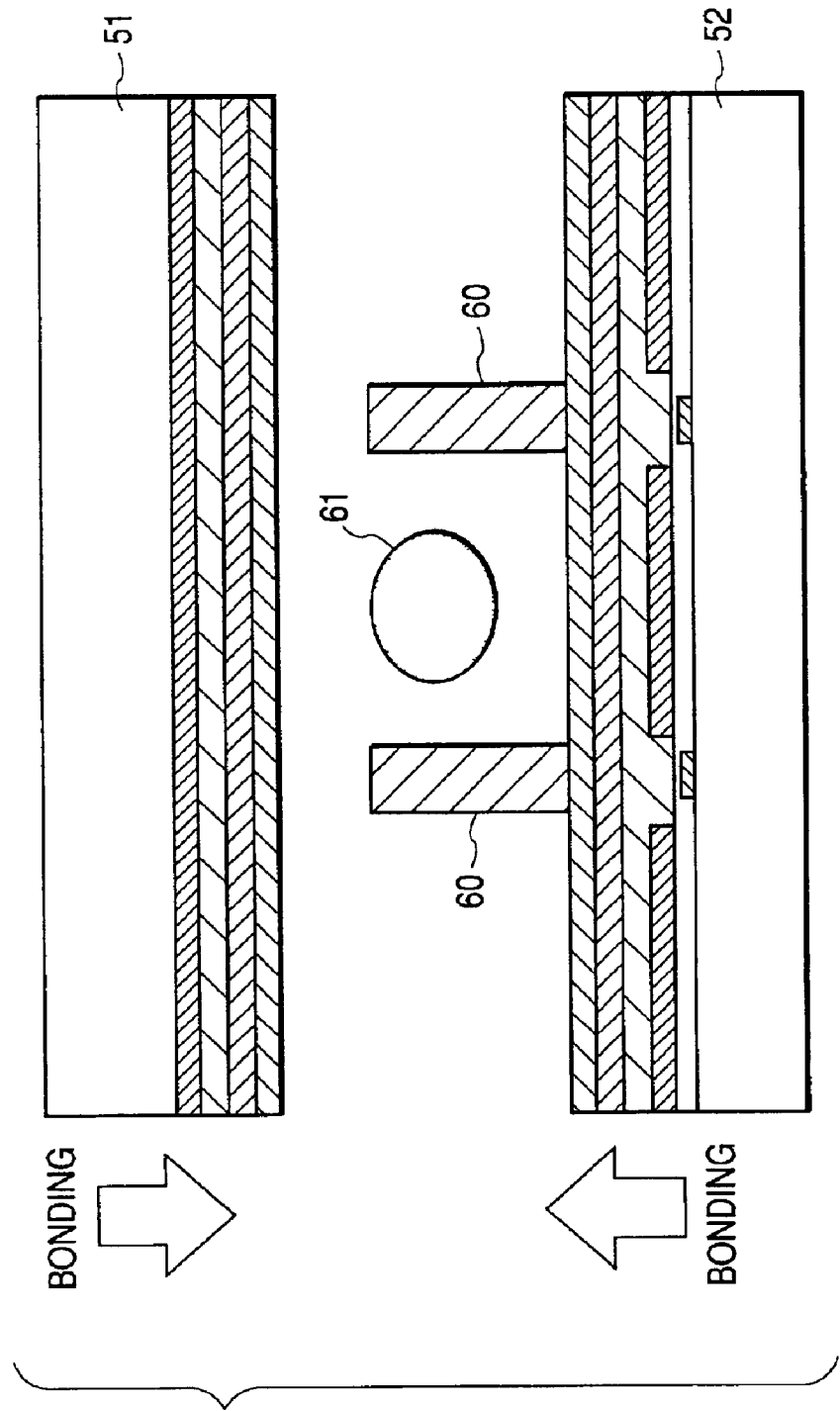
FIG. 7 is a schematic sectional view of a liquid crystal device in which a cell gap is maintained by use of conventional stripe bulkhead structures.

When the liquid crystal undergoes volumetric shrinkage because of temperature change or phase change in the aforementioned filling step or the like, the atmospheric pressure P pushes the substrates to compress the bulkheads 16 in order to fill voids occurring because of the volumetric shrinkage. This causes a change of $\Delta L$ in the bulkhead height L as shown in FIG. 5.

At this time the following equation holds. (Zairyorikigaku (the strength of materials): Minoru Kawamoto, pp. 3–55, Kyoritsu Shuppan K. K.)

$$P(A1/A2)=E(\Delta L/L)$$

In the above equation, E represents the elastic modulus of the bulkhead material, and bulkhead materials applicable in the present embodiment have the elastic modulus of about 400–450 ($10^5$ N/m$^2$). The bulkheads 16 are those within the elastic characteristic range.

Since the bulkheads shrink so as to avoid occurrence of a void in fact, a force pushing the substrates is a difference between the atmospheric pressure and the pressure of the liquid crystal inside. However, since the pressure of the liquid crystal about to shrink can be assumed to be approximately zero, the force P pushing the substrates becomes 1 atm (760 mmHg).

Accordingly, the change amount $\Delta L$ (bulkheads) of the bulkhead height is expressed as follows from the above equation.

$$\Delta L(\text{bulkheads})=(1/E) \times L \times P \times (A1/A2) \quad (1)$$

The volume Vlc of the liquid crystal surrounded by the bulkheads 16 is expressed by $D \times L \times H$, and, where a volumetric shrinkage amount of the liquid crystal is $\Delta Vlc$, a condition for avoiding occurrence of a void in the direction H and in the direction D is that the volume change of the liquid crystal is concentrated on the change $\Delta L$ in the thickness direction to satisfy the following relation:

$$\Delta Vlc = \Delta L \times D \times H.$$

From the above equation, a change amount $\Delta L$ (liquid crystal) of the height component upon the volumetric shrinkage of the liquid crystal is given as follows.

$$\Delta L(\text{liquid crystal})=\Delta Vlc/(D \times H) \quad (2)$$

From above Eqs (1) and (2), upon the volumetric shrinkage of the liquid crystal the following relation needs to be satisfied in order to make the bulkheads 16 follow the shrinkage and completely fill the voids.

$$\Delta L(\text{bulkheads}) \geq \Delta L(\text{liquid crystal})$$

Then, this relation can be written as follows.

$$(1/E) \times L \times P \times (A1/A2) \geq \Delta Vlc/(D \times H) \quad (3)$$

Eq (3) can also be rewritten as follows.

$$(1/E) \times P \times (A1/A2) \geq \Delta Vlc/Vlc \quad (4)$$

In Eq (4), the right side is a ratio of the volume change amount $\Delta Vlc$ to the volume Vlc of the liquid crystal, which represents a volumetric shrinkage ration and which is independent of how to select the base volume. Therefore, Eq (4) is a condition that should hold for the liquid crystal of an arbitrary volume. Incidentally, Vlc' in FIG. 5 shows the volume of the liquid crystal after the shrinkage.

Further, because the volumetric shrinkage resulting from a temperature variation is considered here, it is needless to say that the volume change amount $\Delta Vlc$ is defined as the maximum volumetric shrinkage amount when the temperature varies entirely within the presumed temperature variation range, i.e., a difference between a maximum volume and a minimum volume within the temperature range, and the volume Vlc at an initial state as a standard is defined as a volume at a highest temperature within the presumed temperature variation range. The term "volumetric shrinkage ratio" used herein refers to the ratio of $\Delta Vlc$ to Vlc as each defined above.

The elastic modulus, the dimensions, and the number of the bulkheads are determined so that Eq (3) or (4) holds for a volumetric shrinkage amount or a volumetric shrinkage ratio determined by a temperature variation range in an ambience in which the liquid crystal device is placed. As apparent from Eq (3) or (4), against a volumetric shrinkage change of the liquid crystal, the bulkheads 16 become able to be compressed in response to the shrinkage and thus suppress the occurrence of a void part, by selecting a small value for the elastic modulus E of the material of the bulkheads 16, a large value for the height L of the bulkheads 16, or a small value for the total area A2 of contact surfaces between the bulkheads 16 and one glass substrate.

In production of the liquid crystal device, the liquid crystal in a state with flowability, e.g., in the isotropic phase or in the nematic phase, is charged and sealed in the cell and thereafter the temperature is lowered to the room temperature to cool it. When the elastic modulus and dimensions of the bulkheads are determined so that the volumetric shrinkage amount or volumetric shrinkage ratio at this time satisfies above Equation (3) or (4), the bulkheads 16 become able to be compressed in response to the volumetric shrinkage of the liquid crystal. The same consideration can also apply similarly to situations where the temperature varies in the subsequent steps. This can suppress the occurrence of a void part in the panel with temperature change or phase change of the liquid crystal in the production steps. As a result, uniform and good orientation regions are assured in the liquid crystal device and high contrast is also achieved, thus enhancing the display quality of the liquid crystal device.

When a display device is constructed using the liquid crystal device of the present invention, ambient temperatures vary during operation or in the middle of transportation and storage, but it is feasible to prevent degradation of the display quality during operation, during transportation, and during storage when the maximum volume change amount or maximum volume change coefficient of the liquid crystal in an estimated temperature range is set to satisfy (3) or (4).

The total area A2 is expressed by the product of the width of the bulkheads 16 (hereinafter referred to as "bulkhead width"), the length H of the bulkheads 16, and the number of bulkheads 16. Since the length H and the number of bulkheads 16 are constant, the total area A2 can be decreased by decreasing the bulkhead width. When a small value is set for the bulkhead width in this way, the occurrence of a void part can be suppressed against the volumetric shrinkage of the liquid crystal.

However, if the value of each factor in above Equation (3) or (4) is subject to extreme change, there will appear influence on impact resistance of the panel and on the filling property and orientation property of the liquid crystal. Therefore, change in the value of each factor needs to be effected within a predetermined range where there occurs no influence on the impact resistance of the panel and others.

Described below are experiments conducted in order to verify the validity of above Eq (3) or (4).

An experiment to vary the bulkhead width of the bulkhead structures was conducted as Experiment 1.

Table 1 below presents the results of the experiment showing counts of void portions appearing in the panel with change in the bulkhead width. In this experiment, the bulkhead spacing D was 180 $\mu$m, the bulkhead height L was 1.1 to 1.3 $\mu$m, and the number of bulkheads was fixed.

TABLE 1

| Bulkhead width | 6 $\mu$m | 10 $\mu$m | 14 $\mu$m |
| --- | --- | --- | --- |
| Number of voids | 0 | 15–30 | 150–350 |
| Number of voids after storage at low temperature | 0 | 25–100 | 300–1000 |

As apparent from this Table 1, the number of void portions appearing in the liquid crystal device with change in the bulkhead width in above Eq (3) becomes smaller with decrease of the bulkhead width, and in the present embodiment the bulkhead width is preferably narrower than 10 $\mu$m. Particularly, when the bulkhead width was 6 $\mu$m, the occurrence of a void part was able to be suppressed even after the storage at low temperature. Since the bulkheads 16 are able to keep the glass substrate clearance constant and uniform within the liquid crystal device plane, it becomes feasible to implement uniform driving characteristics in plane.

Then, an experiment to vary the bulkhead spacing D of the bulkheads 16 was conducted as Experiment 2 in order to further verify the validity of Equation (3) or (4).

Table 2 below presents the results of the experiment showing counts of void portions appearing in the liquid crystal device with change in the bulkhead spacing D. In this experiment, the bulkhead width was fixed at 10 $\mu$m and the bulkhead height L at 1.1 to 1.3 $\mu$m.

TABLE 2

| Bulkhead pitch | 180 $\mu$m | 360 $\mu$m | 540 $\mu$m | 720 $\mu$m |
| --- | --- | --- | --- | --- |
| Number of voids | 10–20 | 0 | 0 | 0 |
| Number of voids after storage at low temperature | 50–150 | few (2–5) | 0 | |

As apparent from this Table 2, the number of void portions appearing in the liquid crystal device with change in the bulkhead spacing (=bulkhead pitch–bulkhead width) D in above Eq (3) becomes smaller with increase in the bulkhead spacing D, and in the present embodiment the bulkhead pitch is preferably not less than 360 $\mu$m (D=360–10=350 $\mu$m). Particularly, when the bulkhead pitch was either of 540 $\mu$m and 720 $\mu$m, the occurrence of a void part was able to be suppressed even after the storage at low temperature.

In the above two experiments the bulkheads were formed so as to be substantially perpendicular to the direction of layers of the smectic liquid crystal. This is for quickly effecting the migration of the liquid crystal in the layers and avoiding the influence of waviness and incommensurateness of the layers, as described above. At the same time, there is also the effect that the smectic layers become resistant to damage against warping deformation of the substrates (which is easy to occur in the direction normal to the bulkheads), thus presenting the advantage in impact resistance.

Without having to be limited to the values addressed in the present embodiment, the elastic modulus of the bulkhead material used in the two experiments may be set to any value satisfying Equation (3) or (4) presented in the present embodiment. Particularly, it is desirable to employ the elastic modulus within the range of 200 to 500 ($10^5$ N/m$^2$).

The bulkhead material used in the above two experiments was the acrylic photosensitive material, but other positive or negative photosensitive materials may also be applied without posing any specific problem. Further, the substrate on which the bulkheads 16 were formed, was one substrate 11$b$ out of the pair of glass substrates 11$a$, 11$b$, but the bulkheads may also be formed on the other glass substrate 11$a$.

Moreover, since the $SiO_2$ ultrafine particles were used in order to keep the substrate clearance constant better within the plane of the liquid crystal device, it is possible to decrease the number of $SiO_2$ ultrafine particles or use no such particles if the substrate clearance can be maintained constant by only the bulkheads 16. Further, there are no specific restrictions on the scattering of the $SiO_2$ ultrafine particles, and thus they may also be scattered on the substrate side where the bulkheads 16 are not formed.

The rubbing treatment was done after the formation of bulkheads, but it may also be conducted before the formation of bulkheads. Further, the rubbing treatment conditions for the substrate 11$b$ with the bulkheads 16 do not always have to be the same as those for the substrate 11$a$ without the bulkheads 16, but the rubbing treatment conditions may be different between the upper and lower substrates 11$a$, 11$b$ as long as they are conditions for implementing the optimal orientation of the liquid crystal.

In addition, the cloth for the rubbing treatment does not have to be limited to only cotton, but may be rubbing cloth with polyamide pile or any other cloth, without affecting the effect described in the present embodiment.

The above embodiment presented the example in which the rubbing was carried out in parallel with the stripe direction of the bulkheads and in which the smectic layers were formed normally thereto, but the present invention can also be applied to other liquid crystals.

In the case of ferroelectric liquid crystals that transition from the chiral nematic phase to the smectic C phase without passing the smectic A phase, an angle except for 90° is normally made between the rubbing direction and the smectic layer direction. In that case, the smectic layers can be formed approximately normally to the bulkheads by tilting the rubbing direction by a fixed angle from the bulkhead direction.

As another example, there are some liquid crystals of the same phase series wherein uniform orientation is achieved better by carrying out the rubbing in the bulkhead direction and thereby forming the smectic layers oblique to the bulkheads. In such cases, the uniformity of the smectic layers and the in-layer flowability both are improved, so as to be able to suppress the occurrence of a void better.

The liquid crystal materials applicable herein are not limited to only the ferroelectric liquid crystals of the kinds described above, but similar effects as in the present embodiment can also be achieved by use of other ferroelectric liquid crystal materials such as the antiferroelectric liquid crystals and the like, or other different smectic liquid crystal materials.

According to the present invention, as described above, a number of bulkheads for forming the desired clearance between the pair of substrates are provided on at least one of the pair of substrates retaining the liquid crystal in between so that the relation of $(1/E) \times L \times P \times (A1/A2) \geq \Delta Vlc/(D \times H)$ is satisfied by the elastic modulus E of the bulkheads, the height L of the bulkheads, an outside pressure P, the area A1 of the substrate, the total area A2 of contact surfaces between the bulkheads and the substrate, the volumetric shrinkage change amount $\Delta Vlc$ of the liquid crystal, the spacing D of the bulkheads, and the length H of the bulkheads, whereby it is feasible to make the bulkheads shrink in response to the volumetric shrinkage of the liquid crystal, thereby preventing the occurrence of a void part due to the phase change of the liquid crystal.

What is claimed is:

1. A liquid crystal device comprising a pair of substrates retaining a smectic liquid crystal therebetween and a plurality of bulkheads intersecting with a direction of a layer of the smectic liquid crystal provided on at least one of the pair of substrates, wherein an elastic modulus E of the bulkheads, an outside pressure P, an area A1 of the substrate, a total area A2 of contact surfaces between the bulkheads and the substrate, and a volumetric shrinkage ratio $\Delta Vlc/Vlc$ of the smectic liquid crystal within a temperature variation range of an atmosphere in which the liquid crystal device is placed satisfy the following relation:

$$(1/E) \times P \times (A1/A2) \geq \Delta Vlc/Vlc.$$

2. A liquid crystal device comprising a pair of substrates retaining a smectic liquid crystal therebetween and a plurality of stripe bulkheads intersecting with a direction of a layer of the smectic liquid crystal provided on at least one of the pair of substrates, wherein an elastic modulus E, a height L, a spacing D, and a length H of the bulkheads, an outside pressure P, an area A1 of the substrate, a total area A2 of contact surfaces between the bulkheads and the substrate, and a volumetric shrinkage amount $\Delta Vlc$ within a temperature variation range of an atmosphere in which the liquid crystal device is placed, of the smectic liquid crystal filled in a space defined by the pair of substrates and a pair of bulkheads satisfy the following relation:

$$(1/E) \times L \times P \times (A1/A2) \geq \Delta Vlc/(D \times H).$$

3. The liquid crystal device according to claim 1 or 2, wherein the bulkheads intersect at an angle of approximately 90° with the direction of the layer of the smectic liquid crystal.

4. The liquid crystal device according to claim 1 or 2, wherein the bulkheads intersect at an angle except for 90° with the direction of the layer of the smectic liquid crystal.

5. The liquid crystal device according to claim 1 or 2, wherein the pair of substrates are bonded to each other by the bulkheads.

6. The liquid crystal device according to claim 1 or 2, wherein a width of the bulkheads is less than 10 μm.

7. The liquid crystal device according to claim 1 or 2, wherein a pitch of the bulkheads is not less than 360 μm.

8. The liquid crystal device according to claim 1 or 2, wherein the elastic modulus of the bulkheads is in a range of 200 to 500 ($10^5$ N/m$^2$).

9. The liquid crystal device according to claim 1 or 2, wherein the bulkheads are made of an acrylic photosensitive resin.

10. The liquid crystal device according to claim 1 or 2, wherein the smectic liquid crystal is a ferroelectric liquid crystal or an antiferroelectric liquid crystal.

* * * * *

UNITED STATES PATENT AND TRADEMARK OFFICE
CERTIFICATE OF CORRECTION

PATENT NO. : 6,788,381 B2 Page 1 of 2
DATED : September 7, 2004
INVENTOR(S) : Hachisu et al.

It is certified that error appears in the above-identified patent and that said Letters Patent is hereby corrected as shown below:

<u>Column 1,</u>
Line 22, "was" should read -- was a --.

<u>Column 5,</u>
Line 21, "FIG. 2" should read -- FIG. 2 is -- and "of" should read -- of a --.

<u>Column 8,</u>
Line 67, "ration" should read -- ratio --.

<u>Column 10,</u>
Table 2, line 42,
"

Table 2

| Bulkhead pitch | 180 µm | 360µm | 540 µm | 720 µm |
|---|---|---|---|---|
| Number of voids | 10-20 | 0 | 0 | 0 |
| Number of voids after storage at low temperature | 50-150 | few (2-5) | 0 | |

"
should read
--

Table 2

| Bulkhead pitch | 180 µm | 360µm | 540 µm | 720 µm |
|---|---|---|---|---|
| Number of voids | 10-20 | 0 | 0 | 0 |
| Number of voids after storage at low temperature | 50-150 | few (2-5) | 0 | 0 |

--.

UNITED STATES PATENT AND TRADEMARK OFFICE
CERTIFICATE OF CORRECTION

PATENT NO. : 6,788,381 B2
DATED : September 7, 2004
INVENTOR(S) : Hachisu et al.

It is certified that error appears in the above-identified patent and that said Letters Patent is hereby corrected as shown below:

Column 10 (cont'd),
Line 51, "as" should read -- As is --.
Line 58, "and" should read -- or --.

Signed and Sealed this

Eleventh Day of January, 2005

JON W. DUDAS
*Director of the United States Patent and Trademark Office*